350-96.17 SR
XR 3,423,594
1 X 5066H
CROSS REFERENCE SEARCH ROOM

INVENTOR
ANTHONY G GALOPIN

3423594
OR IN 250/211 J

INVENTOR
ANTHONY G. GALOPIN

INVENTOR
ANTHONY G. GALOPIN

INVENTOR
ANTHONY G GALOPIN

INVENTOR.
ANTHONY G. GALOPIN
BY
Flehr, Hohbach, Test, Albritton & Herbert
ATTORNEYS United States Patent Office 3,423,594
Patented Jan. 21, 1969

3,423,594

PHOTOELECTRIC SEMICONDUCTOR DEVICE WITH OPTICAL FIBER MEANS COUPLING INPUT SIGNALS TO BASE

Anthony G. Galopin, 1459 Beacon St., Brookline, Mass. 02146

Filed Mar. 3, 1964, Ser. No. 349,062
U.S. Cl. 250—211 20 Claims
Int. Cl. H01j 39/12

ABSTRACT OF THE DISCLOSURE

A photosensitive semiconductor device in which a plurality of fiber optic light rods are coupled to a light sensitive base portion of the device. Depending on the specific type of photosensitive device, several logic functions, such as "AND," "OR," integration, mixing, etc., may be accomplished by selectively directing light signals through the optical fibers. In addition, the threshold level of the photosensitive area may also be optically controlled by light to vary the effect of the plurality type input.

The present invention relates to semiconductor devices. More particularly the invention relates to photosensitive semiconductor devices, such as single and multiple junction semiconductors. The term photosensitive as used herein includes devices which are responsive to electromagnetic energy in the photoelectric sense without regard to frequency. The term further includes energy absorptive devices in the region of optical frequencies.

Semiconductive devices which are responsive to optical frequency and photoactive energy are well known. Many semiconductive devices are inherently photosensitive in one form or another. Because of this very characteristic semiconductors are typically packaged in such a manner as to eliminate photosensitivity. In those cases, however, where the effect is particularly desired, the semiconductor device is exposed to broad or gross optical environment. In such event the device as a whole responds to the ambient light condition.

In the prior art, there are examples of focusing devices which are used to focus, for example, a beam of light on a semiconductor device to provide an electrical output signal. Such prior art photoelectric semiconductor devices are characterized by the requirement of high signal level, relatively complicated and massive optical focusing equipment and in general are not suitable for small signal requirements.

In the computer field, for example, there is a general requirement for semiconductor neural elements, which perform in a manner analogous to biological neural behavior. It is frequently highly desirable to perform these functions in conjunction with sensors of an optical nature. The lack of optical sensors which can be readily attached directly, for example, as part of the switching network, limit the flexibility and capability of prior art optical data processing systems.

It is highly desirable in the data processing field, and for other applications, to be able to sense and process optical data in a continuous flow with little or no discontinuities because of the introduction of intermediate coupling elements. In particular, it is highly desirable to introduce data directly from an optical sensor to a data handling device. It is highly desirable directly to translate optical signals into electrical signals for summing, thresholding and gating circuitry.

In contrast with the prior art photoelectric semiconductor systems, the photoelectric device of the present invention involves an integral optical sensor which directs light signals to the photoactive area of, for example, a single semiconductor rectifying area.

It is, therefore, an object of the invention to provide an improved photoelectric device for optical sensing and data handling.

Another object of the invention is to provide an improved photoelectric device capable of responding to a plurality of discrete light signals.

Still another object of the invention is to provide an improved photoelectric device useful as a neural element in teaching machines.

Yet another object of the invention is to provide an improved photoelectric device sensitive to a relatively small, discrete light signal.

Still a further object of the invention is to provide an improved photoelectric device useful for both digital and analogue applications.

Yet a further object of the invention is to provide an improved photoelectric device for combining or modulating light signals.

A further object of the invention is to provide an improved photoelectric semiconductor device which is compact and economical to fabricate.

Another object in the invention is to provide an improved photoelectric device for converting optical to electrical signals, which is particularly reliable in operation.

Yet another object of the invention is to provide an improved photoelectric semiconductor device for converting optical to electrical signals which is useful for relatively small optical signals.

In accordance with the invention there is provided a photoelectric device. The device includes a semiconductive base having a rectifying junction. The base is responsive to electromagnetic energy in the vicinity of the junction. Coupling means are provided and include path defining elements coupled to the base adjacent the junction for coupling electromagnetic energy signals from a signal source along and within the elements to the base. Output means are coupled to the base for providing output electrical signals in response to electromagnetic signals from the source.

In the preferred mode of operation the base is responsive to light energy. The coupling means are optical and include an optical fiber coupled to the base adjacent to the junction for coupling light energy signals from a signal source along and within the fiber to the base. The output means provide output electrical signals in response to light signals from the source.

In one form of the invention a photosensitive semiconductor is provided having a type PN rectifying junction.

In another form of the invention the path defining element is in contact with the base adjacent to the junction.

In still another form of the invention a semiconductor is utilized having a circular base in PN rectifying junction with an emitter and an annular collector. The emitter and collector are coaxially disposed on opposite sides of the base. An ohmically joined, conductive electrode extends from the emitter, the collector and the base. The base is responsive to light energy. Optical coupling means are provided including an optical fiber coupled to the base within the annular collector for coupling light signals along and within the fiber to the base in the vicinity of a junction. Output means are coupled to the semiconductor device for providing output electrical signals in response to light signals from the source.

Other and further objects of the invention will be apparent from the following description of the invention taken in connection with the accompanying drawings, and its scope will be pointed out in the appended claims.

*Principles of operation*

Figure 1:
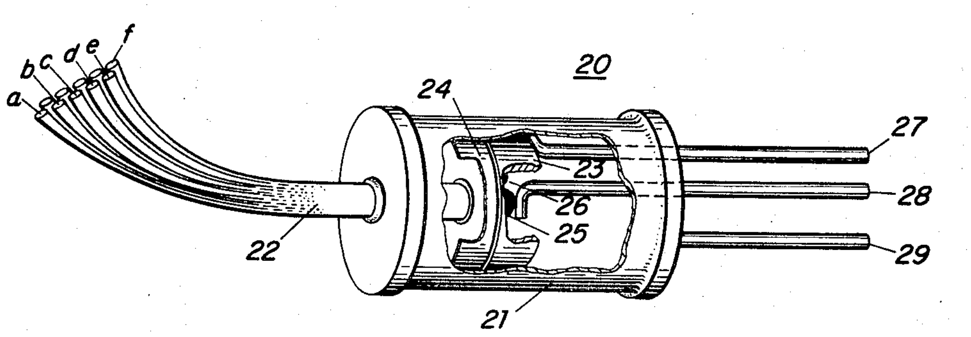
FIG. 1 is a perspective view, partially cut away, of a photoelectric device embodying the invention.

In the preferred mode of the invention, fiber rods, formed, for example, from glass, transmit light energy from a signal source to a photoactive semiconductor region. These optical fiber rods transmit light without significant loss of intensity, distortion, or interference, crosstalk, with adjacent rods even though they are curved, bent, or twisted in one or more places. The optical characteristics of such fiber rods are well known, having a refractive index at the outer periphery which is smaller than the refractive index at the interior. This results in a reflection of the light rays from one surface to another as they travel along the length of rod to provide a discrete transmission path and terminus. Fiber rods can be formed as small as .001 inch or less in diameter. They may be fused together to provide hermetically sealed construction.

In the preferred mode of operation, a base region is very sensitive to light energy. An optical fiber rod or rods are coupled to the base adjacent to an active rectifying junction for coupling light energy signals from a signal source or sampling area along and within the fiber to the base region. The conducted photons then activate the photosensitive region and provide the minority carriers which cause the semiconductor action and electron multiplication. The electrical signal thus derived is in response to light signals.

In one form of the invention a semiconductive unit is provided which consists of a PN rectifying junction and the optical connection to this junction through the use of optical fiber rods. This permits the activation of the device at its area of greatest sensitivity and provides a multipurpose unit which may be used as a photoconductive or photovoltaic element.

Another form of the invention utilizes an active semiconductor junction as a control junction with an additional junction as a signal or collector mechanism. This provides an electron multiplication capability which greatly increases the sensitivity and attributes of the device. The optical signals are directed to the photosensitive center material or base via the fiber rods and provide the photon activation which determines the signal response of the unit.

The base may be circular, of P-type material to form a PN barrier junction with an N-type injector or emitter. An N-type annular collector ring completes the multiple junction photosemiconductor. The injector or emitter and the collector may be coaxially disposed on opposite sides of the base.

Prior art photosensitive devices characteristically respond totally with respect to an input signal. A photoconductor, for example, typically varies in total impedance independent of the position of an input signal. In a similar manner a photovoltaic cell produces an output voltage in response to the total intensity of light impingent on the cell and substantially independent of the position of the light on the cell. Similarly, phototransistors respond to the intensity of the total amount of light impingent upon the cell.

In contrast, the photoelectric device of the present invention uniquely responds to a discrete micro-light signal. The device produces an output electrical signal, which may be chosen with respect to a number of parameters. The output electric signal, for example, may be responsive to an input light signal in accordance with three mutually orthogonal reference axes of position. Thus the output signal may respond to the position of an input micro-light signal in the XY plane, as well as the degree of penetration along an axis perpendicular to the plane. The device, for example, may be sufficiently transparent as to enable the use of coincidence circuitry for a single discrete micro-light signal.

In addition, the output signal responds to the intensity of an input micro-light signal. In contrast with the prior art, however, the present invention has a much lower threshold and, hence, a much greater sensitivity to an input signal.

For switching, gating, and integrating circuitry, the device of the instant invention responds to a plurality of discrete input light signals. The output electrical signal may be produced in response to the presence of a single input light signal, only in response to N input signals or in response to a single input signal of varying intensity. With the present device, N discrete input signals can control, singly or in combination, M parallel junctions.

By a suitable choice of a combination of multiple rectifying junctions and ohmic connections, an anologue of a neural element is obtained. Thus the device is enabled to respond in accordance with the presence of a bias light signal as well as a variable light signal. Further, the device may be controlled by a bias electrical signal or a variable electrical signal. The combination of variable light and electrical signals, as well as bias light and electrical signals, introduces a degree of flexibility previously unavailable.

Thus the instant invention has application to a broad range of photosensitive mechanisms, including photoconductors, photovoltaic elements, as well as photosensitive amplifying elements. Here the device may respond to a succession of discrete signals along a given path defining element or to a plurality of discrete sources of signals along a plurality of path defining elements.

Figure 2:
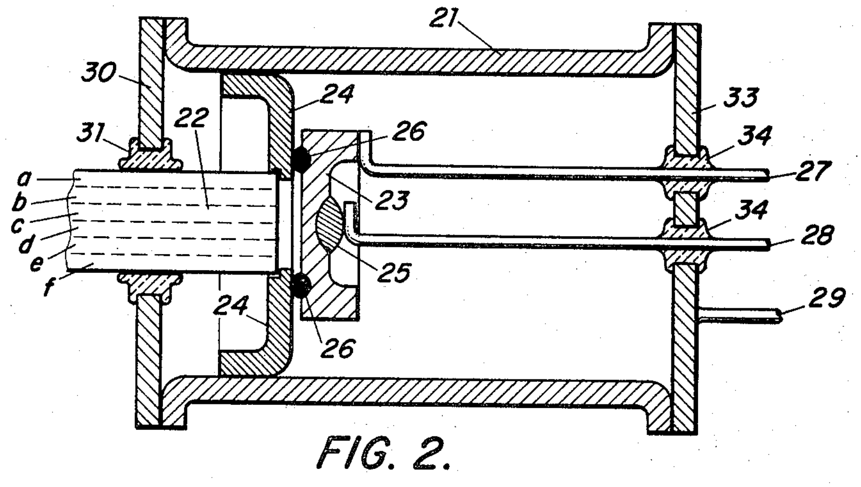
FIG. 2 is a detailed view illustrating the internal mounting and connection of the device in FIG. 1.
Figure 2A:
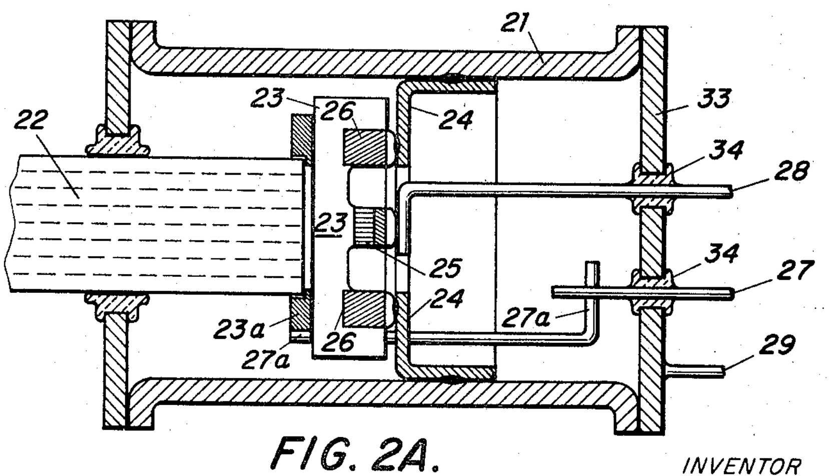
FIG. 2A is a sectional view of a modification of the device in FIG. 2.

*Description and explanation of the photoelectric device in FIGS. 1, 2, and 2A*

Referring now to the drawings and the particular reference to FIGS. 1 and 2, there is here illustrated a photoelectric device embodying the invention.

The photo electric device is generally indicated at 20. As shown, the device includes a housing 21, a bundle of optical fibers 22 coupled to a base 23 of a semiconductor device embodying the invention.

The device as shown is an NPN semiconductor unit. A supporting structure 24 carries the base 23. An emitter 25 and collector 26 are shown joined to the base 23. Conductive ohmic connection leads 27, 28, and 29 extend from the base, emitter and collector, respectively.

An optical fiber rod bundle 22 typically is jacketed in glass and hermetically sealed to the end cap of the housing 21. Each fiber provides a path defining element for the transmission of discrete light signals. The fiber rods may be tapered and separated from the bundle, as shown. The structure 24 here is connected to the collector 26 and the housing 21.

Referring now to FIG. 2, the bundle of optical fibers is formed from glass of differing indices of refraction in accordance with well known principles of the art. The bundle 22 is sealed to a header cap 30 by means of a glass to metal seal 31, such as a Kovar seal. The structure 24 is shown ohmically connected to the annular collector 26. A metallic stem cap 33 encloses the cylindrical housing 21 at the other end. The leads 27, 28, 29 extend through the cap 33 and are secured in place through, for example, by ceramic or glass seals 34. The fiber rods 22*a, b, c, d*, etc. are each terminated in coupling proximity with the base 23 in the vicinity of the junctions between the emitter and the base. The unit as a whole is sealed by virtue of the enclosure provided by the cylindrical housing shell 21, the header cap 30 and the stem cap 33.

Referring now to FIG. 2A, there is here illustrated a sectional view of a modification of the device in FIG. 2 having a diffused junction structure. Throughout the description of the devices illustrating the embodiments of the invention, wherever possible like reference numerals will be used for like elements.

In the photoelectric device of FIG. 2A, the emitter 25 and the annular collector 26 are formed on the same side of the base 23 in accordance with well known diffusion techniques. To provide separation between the centrally disposed emitter and the coaxial, annular collector, the base is etched to provide an annular trough. This structure is to be distinguished from the alloy junction configuration of FIG. 2. A metal centering connector 23A is ohmically connected to the base 23 and has a channel formed in it to receive the bundle 22. The connector 23A is connected to an element 27A, which is connected to the stem base connector 27.

By using accurately controlled diffused junctions and a carefully directed illumination area, photomultiplication is obtained. This is particularly true in the region of the emitter base junction. The thickness of the base must be carefully controlled to permit the penetration of input light signals through the base to the region of the junction.

In a multiple junction semiconductor device, the area of photosensitivity is at a maximum in the region of the emitter base junction. The effect is to substantially vary the apparent gain in accordance with an input light signal.

Another arrangement of the device of the invention utilizes a linear disposition of elements in contrast with the circular. For an NPN configuration, for example, active junctions of the photoelectric device may be formed with the diffusion of an N-type material into a P-type base on either side of an etched trough. The etched trough provides depth control of the active photosensitive area. The photon conducting rods are positioned to direct the optical signals to the emitter junction with the base and to the base region. An alignment positioner or spacer is joined to the germanium wafer to position the fiber rods. Carrier flow is thus restricted to the active area where the photon activity is concentrated. Further, a plurality of photon areas may be activated by the linear placement of optical fiber rods.

Figure 3:
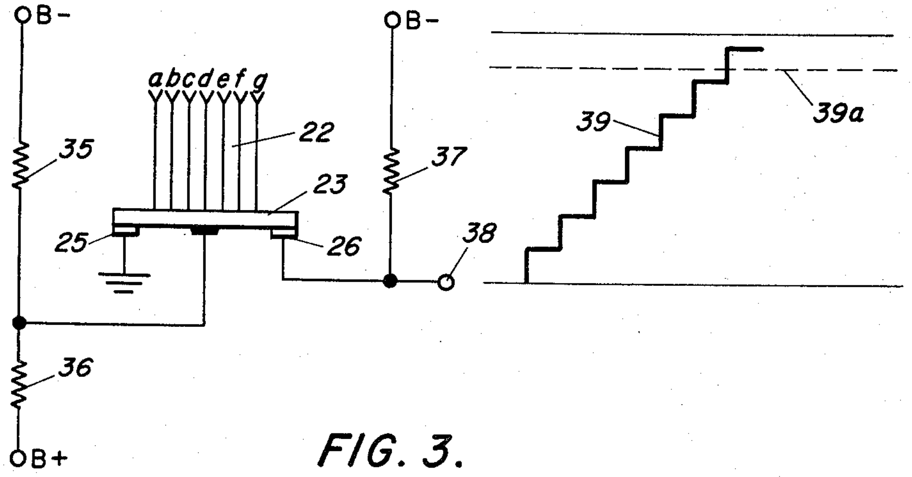
FIG. 3 is a schematic circuit diagram illustrating a circuit embodying the photoelectric device of the invention which is particularly useful for summing or integration.
Figure 4:
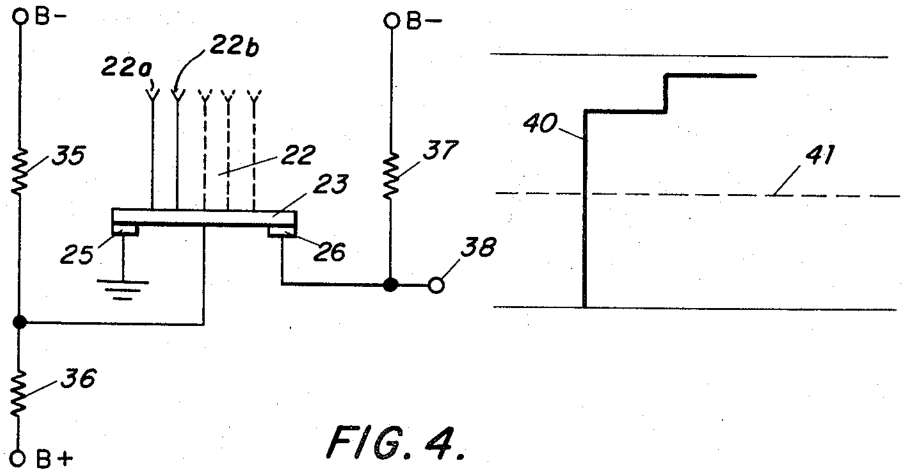
FIG. 4 is a schematic circuit diagram of an "AND" circuit embodying the invention.
Figure 5:
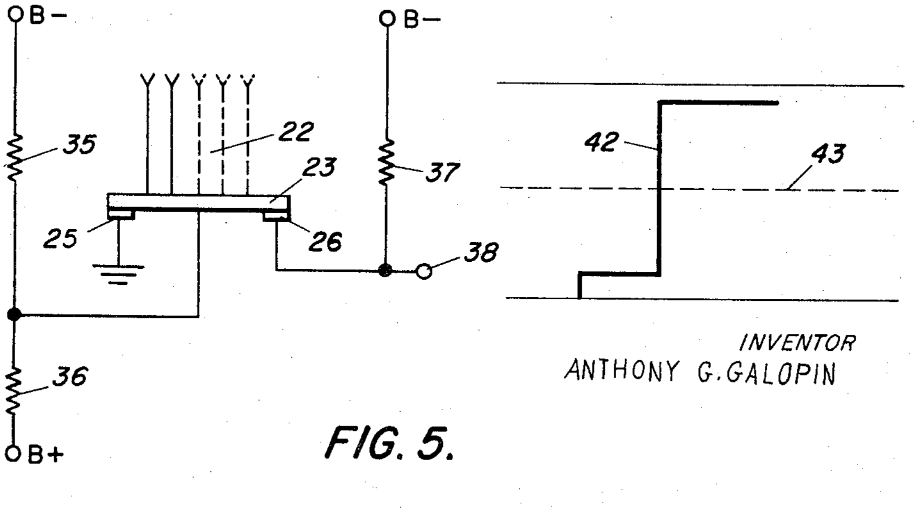
FIG. 5 is a schematic circuit diagram of an "OR" circuit embodying the invention.

*Description and explanation of the circuits in FIGS. 3–5*

Referring now to FIG. 3, there is here illustrated a summing or integration circuit embodying the invention. Here the photoelectric device of the invention is illustrated symbolically. Here a pair of resistors 35 and 36 are connected in series between a source of voltage labelled B− and a source of voltage labelled B+. The junction between the resistors 35 and 36 is connected to the base 23 of the photosemiconductor device. The optical fibers 22 are indicated as coupled to the base 23. The emitter 25 is grounded and the collector 26 is connected through a collector load resistance 37 to B−. The output is taken at the collector terminal 38.

Fiber rods 22 provide a summing of sensor light to the photosensitive base of a photosemiconductor device. The application of successive input discrete light signals to the rods 22 is illustrated by the wave form 39 at the terminal 38. At or above a desired threshold, the summation may be used to trigger a subsequent voltage sensitive, vari-stable state circuit such as a multivibrator or a Schmitt trigger circuit. Thus a summation of input discrete light signals is possible, as well as a thresholding based upon a given input light level or quantization of light signals if the input light intensities are predetermined. The circuit may be used as an integrator for various light sources and assist in a neural function or other application as an integrating device. The number of fiber glass rods used are only limited by the dimension of the exposed base region.

This circuit has application to counting, such as stair-step counters, gating, summing, integrating and other operations in optical data handling.

Figure 3A:
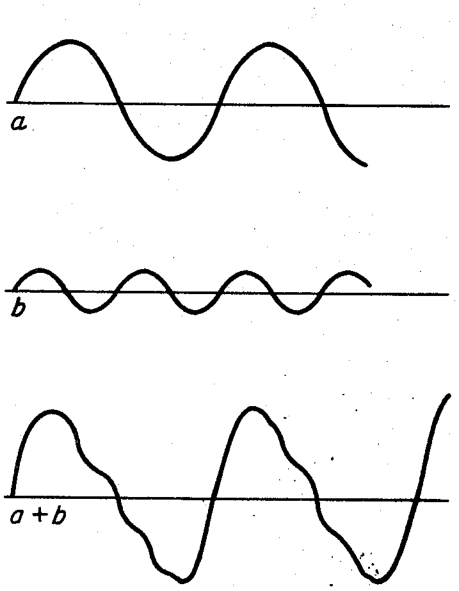
FIG. 3A is a schematic circuit diagram illustrating a modulator circuit embodying the invention.
Figure 3A:
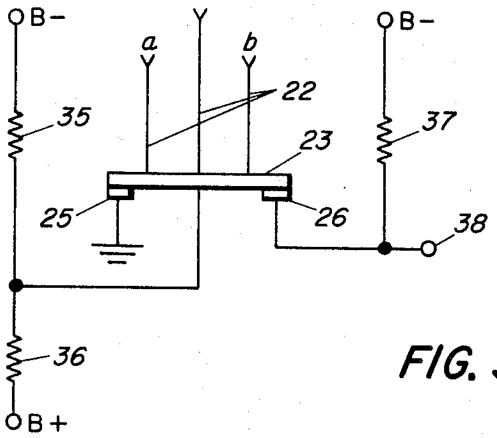

Referring now to FIG. 3A, there is here illustrated an optical mixing or modulation circuit. Here analogue summing and mixing takes place to provide modulated signals and signal products.

The circuit here is similar to that in FIG. 3. An input light signal of the form in curve *a* is coupled to the rod 22*a* and a signal of the form curve *b* is coupled to the rod 22*b*. The output signal is indicated by the curve *a* and *b*.

In accordance with the principles of modulation theory, the carrier signal and a modulation signal are optically introduced and produce a modulated carrier signal in the output. By the use of a plurality of separate input signal sources, multiple signal mixing and modulation is obtained.

The character of the output electrical signal may be determined by controlling the phase of an input continuous wave modulation, light signal relative to the phase of an input contiuous wave, carrier, light signal. The variation of the input signal amplitudes is taken with respect to an input reference light level.

Referring now to FIG. 4, there is here illustrated an "OR" circuit embodying the invention. Here a pair of fibers 22*a* and 22*b* are coupled to the base 23 of the photosemiconductor circuit. The bias voltage of the base 23 is chosen to be such that either a light signal in fiber 22*a* or fiber 22*b* actuates thre device and puts out a signal of this form 40 at the collector terminal 38. The thresholding level of the output signal curve 40 is taken with respect to the dashed line indicated at 41.

This circuit is an example of the application of the device to a wide range of data processing requirements involving light signals. This includes all necessary logical operations such as OR, AND, NOR, NAND, etc.

In the circuit as illustrated the OR circuit responds to one of two possible input signals. A plurality of input signals may be used by adding light rod elements as indicated in dashed form at 22.

Referring now to FIG. 5 there is here illustrated an AND circuit embodying the invention. This circut requires the sum of light signals in fibers 22*a* and 22*b* to produce an output electrical signal. Here the curve 42 is shown with respect to a threshold level 43. Bias of the base 23 is so chosen that only a signal in the fiber 22*a* plus fiber 22*b* is capable of producing an output signal in excess of the level 43. A plurality of input signals may be used by adding light rod elements.

*Description and explanation of the device and circuits in FIGS. 6–9*

Figure 6:
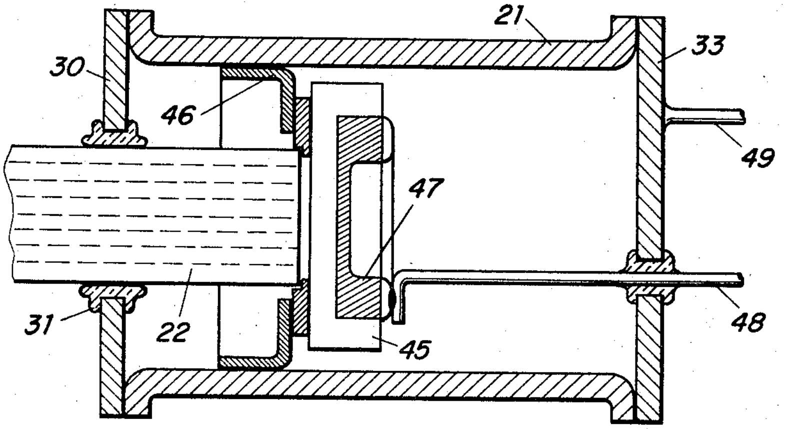
FIG. 6 is a sectional view of a photoelectric, two terminal, single junction semiconductor device embodying the invention.

Referring now to FIG. 6, there is here illustrated a sectional view of a photoelectric single junction device embodying the invention. Here the optical fibers 22 are coupled into the housing 21 through the header cap 30 and seal to a base 45 of a junction diode. A supporting conductive member 46 is connected to the housing 21 and provides support for the fiber rod 22. The semiconductor barrier junction is the sensitive area of the single junction device. An anode 47 is formed from a wafer in junction with the cathode or base 45. A conductive connection 48 is ohmically connected to the anode and extends through the stem cap 33. A cathode lead 49 is ohmically connected to the cathode 45 through the member 46 and housing 21.

Figure 7:
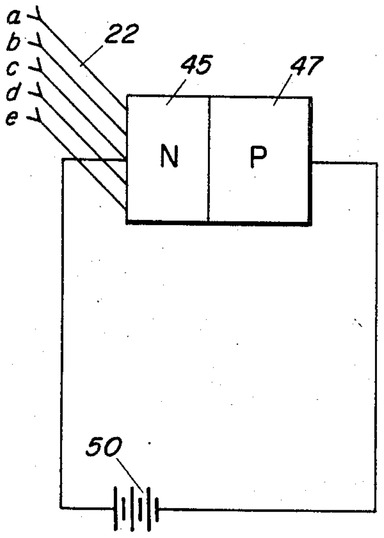
FIG. 7 is a schematic circuit diagram for the device in FIG. 6.

Referring now to FIG. 7 there is here illustrated a schematic diagram of the device in FIG. 6. The anode 47 is shown in rectifying junction with the cathode 45 and connected in series with a battery 50. The optical fibers 22*a*, *b*, *c*, *d*, and *e* are shown as impinging on the cathode 45. The battery voltage applies a back bias voltage for the diode.

Figure 8:
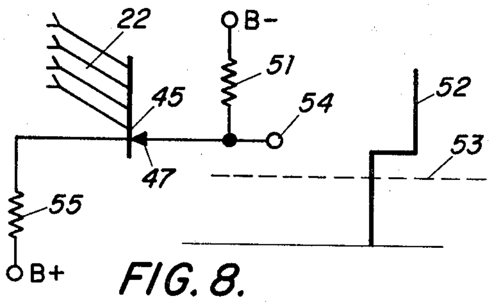
FIG. 8 is a schematic circuit diagram of an "OR" gate circuit utilizing the device in FIG. 6.

Referring now to FIG. 8, there is here illustrated a photoelectric single junction device circuit embodying the invention. A resistor 55 is connected in series with the cathode 45 of the device. The anode 47 is connected in series with a resistor 51 to the source of voltage labelled B−. The resistor 55 is connected to the source of voltage labelled B+. A curve 52, shown relative to a threshold level 53, illustrates the signal output at the anode terminal 54. The circuit as illustrated operates as an OR gate. Thus any one of two or more fiber channels of the bundle 22 may provide the light energy to the device to cross the threshold level in the output as indicated. The values of the resistors and supply voltages are chosen to permit a single light source to produce an output voltage greater than the indicated threshold.

Figure 9:
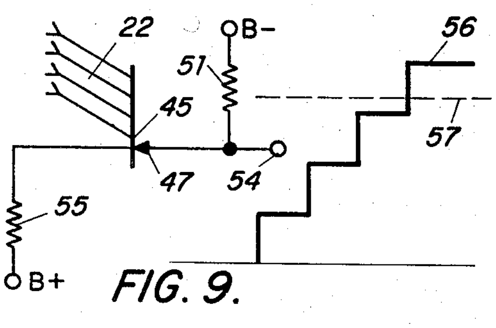
FIG. 9 is a schematic circuit diagram of an "AND" gate circuit utilizing the device of FIG. 6.

Referring now to FIG. 9, there is here illustrated a photoelectric diode AND gate circuit. Here the output curve 56 is shown taken with respect to a threshold level 57. As indicated by the curve 56, the resistor values and voltages are so chosen as to require a combination of two or more simultaneous input light signals from the fiber rods to provide an output signal sufficient to exceed the threshold. This provides an AND capability for the device using a single junction semiconductor.

Figure 10:
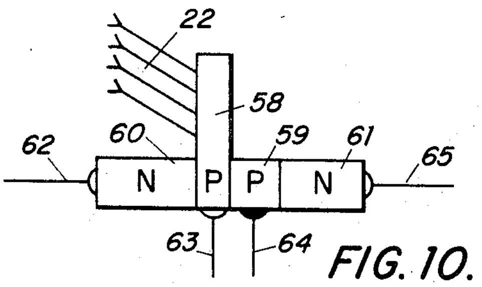
FIG. 10 is a schematic diagram of a four terminal, multiple junction, photoelectric semiconductor device embodying the invention.
Figure 11:
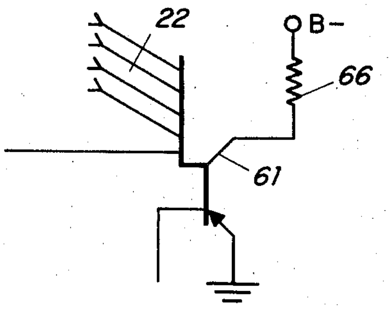
FIG. 11 is a schematic circuit diagram for the device in FIG. 10.

*Description and explanation of the photoelectric device in FIGS. 10 and 11*

Referring now to FIG. 10, there is here illustrated a symbolic diagram of a double-based photoelectric device embodying the invention. This device is electrically a four terminal device wherein the photosensitivity of a portion of the base material may be varied by applying a signal. Here a base 58 is ohmically joined to a base 59. The base 58 is in a rectifying junction with an emitter 60. The base 59 is in a rectifying junction with a collector 61. Conductive connections 62, 63, 64, and 65 extend from the emitter 60, the base 58, the base 59, and the collector 61 respectively. In FIG. 11 a resistor 66 is shown connected in series between the collector 61 and a source of voltage labelled B−.

In neutral perception-type elements, behavior, decision or thresholding capability is analogous to biological behavior. By introducing an electrically variable gain and threshold in accordance with a desired pattern, a series of inputs may be weighted by a variable weighting mechanism thus providing an approach to a learning or perception system. The base 58, termed the control base, permits the weighting of the input light filaments according to fixed or feedback pattern.

Figure 11A:
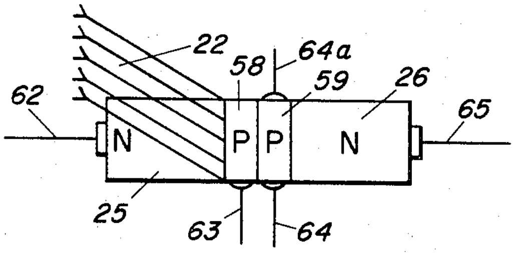
FIG. 11A is a schematic diagram of a modification of the device in FIG. 10.
Figure 11B:
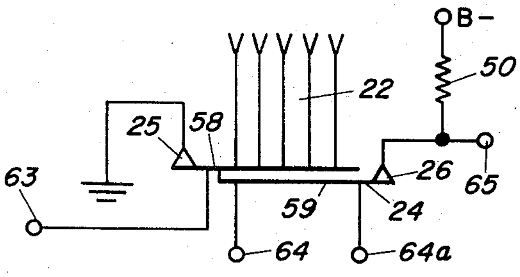
FIG. 11B is a schematic circuit diagram for the device in FIG. 11A.

*Des ription and explanation of the photoelectric device in FIGS. 11A and 11B*

Referring now to FIG. 11A there is here illustrated a modification of the device in FIG. 10. Here the voltage at the base 58 is applied at terminal 63. An additional connection 64*a* to the base 59 permits separate control, as by an electric modula ing signal between terminals 64 and 64*a*.

In FIG. 11B a schematic diagram of the device in FIG. 11A is shown. Here the collector 26 is connected through the load resistor 50 to B−.

Figure 12:
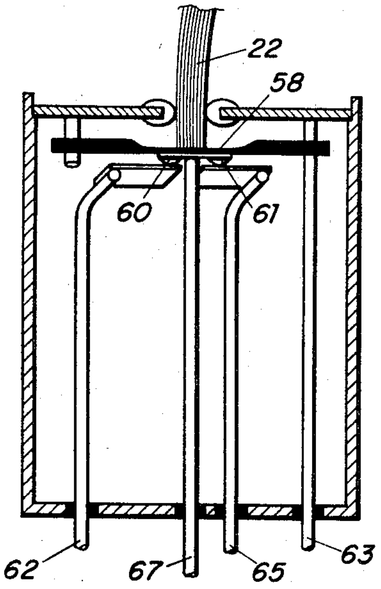
FIG. 12 is a sectional view of a light variable photoelectric device embodying the invention.
Figure 13:
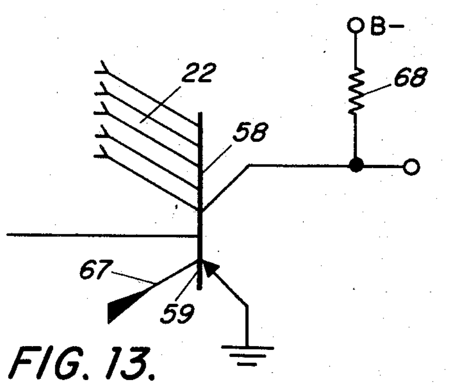
FIG. 13 is a schematic circuit diagram for the device in FIG. 12.

*Description and explanation of the photoelectric device in FIGS. 12 and 13*

Referring now to FIG. 12, there is here illustrated a light variable photoelectric device embodying the invention. Using the same base structure as described with regard to FIGS. 10 and 11, a fixed or biasing source of light may be applied to one of the bases while a variable source or light signal is used to activate the adjacent base. A control fiber rod 67 is coupled to the base 59. The variable or signal source fiber rod bundle 22 is coupled to the base 58. Conductive leads 52, 65, and 63 are ohmically connected to and extend from the emitter 60, the collector 65 and the base 58, respectively. The additional lead 64 may be used to provide an electrical reference voltage and may be used as an additional control. A schematic of the variable control photoelectric device is shown in FIG. 13. While the base area is shown as a continuous surface, there is in reality a signal base area activated by the optical signal rods 22, and a control base area that is activated by the optical control rod 67. The electrical signal is activated across the load resistor 68 from the collector terminal 65.

In the device as illustrated in FIGS. 12 and 13 a change of light level is utilized to activate a double base layer and provide an automatic change of gain and threshold as a function of a bias or control light. This permits a variation of the gain or the weight proportionality in accordance with the control light intensity. It is also possible to vary the activation threshold as a function of the bias light in this manner. Such a capability is extremely useful for example in learning machines where the ability to change weighting or proportionality according to an output, feedback, or other response function of an optical or light character enables a much greater degree of design flexibility and analogous neural behavior. Such a device is particularly useful for automatic or self-correcting change in weights when introduced as a feedback signal. Thus, the device may be utilized to provide a change in the threshold activation level in response to a bias light feedback signal from an optical command computation, which results in a sensitivity variation or threshold variation according to optical inputs and computations.

The structure of a light sensitive or light responsive device utilizing a single base layer is applicable in this context. For example, one may introduce through one or more of the fiber rods of the bundle 22 a steady-state bias light signal to the base *b* and utilize the other rods for variable light signals. The construction of such a unit would be somewhat different from the other suggested single base designs in order to permit the control rod or rods to maintain activation and control over the signal base area.

Figures 14, 14A:
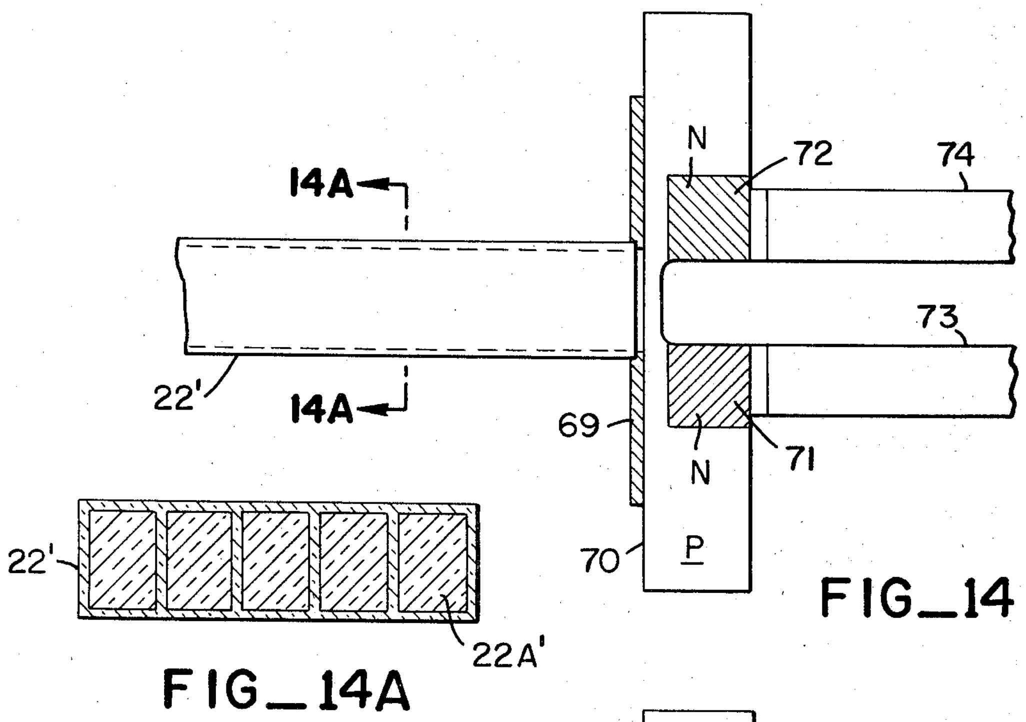
FIG. 14 is a detailed internal view of a two terminal linear design photoelectric semiconductor device embodying the invention.
FIG. 14A is a sectional view taken along the line 14A—14A of the embodiment of FIG. 14.
Figures 15, 15A:
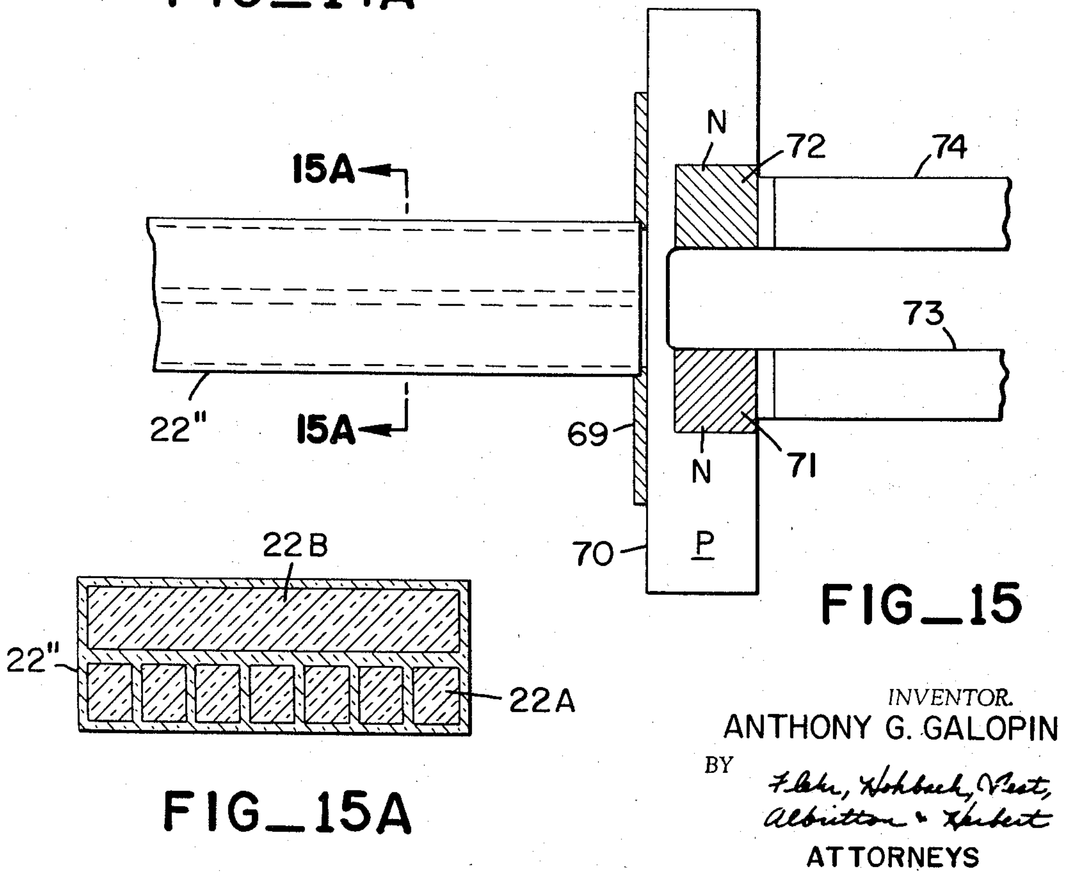
FIG. 15 is a detailed internal view of a linear design photoelectric semiconductor device which utilizes a control optical light rod to provide an ambient or signal control capability.
FIG. 15A is a sectional view taken along the line 15A—15A of the embodiment of FIG. 15.

The configuration of the photoelectric device shown in FIGURES 14 and 15 has reference to a linear version of the invention. This permits special design arrangements and device developments that extend the capabilities of the unit. Referring now to FIGURE 14, there is shown here a semiconductive base of P-type material that is essentially a linear design. The active junctions of the photoelectric device are formed by the diffusion of N-type material along the width of the base. In the unit shown an etched trough is used to provide a depth control of the photoactive base region, and to enhance the photosensitivity of the active base area, 70. The photon conducting rods 22' are positioned to direct the optical signals to the active base region and to the emitter-base junction. Each rod is shown individually as 22A'. An alignment positioner 69, is attached to the germanium wafer in order to direct the optical rods to the desired area. The device shown is a two terminal design, although an additional lead may be attached to the base area to permit an additional electrical control. The diffused areas, 71 and 72, form an emitter 71, and collector 72, respectively, and permit the semiconductor device to operate as a photoactive amplifier. The emitter tab connector 73, and the collector tab connector 74, permit an electrical control of those areas. The linear placement of optical rods 22A' along the width of unit 22' permits a design in which the gain may vary according to the position of the rods. This may be accomplished by the variation of base length, base composition, or base potential gradient along the width of the photoelectric device.

With reference now to FIGURE 15, there is shown here a light conducting rod design 22" which is similar to the linear configuration 22' described in FIGURE 14 whose operation has been explained. The principal difference in the concept shown, is the design of an additional optical control rod or "light pipe" 22B which permits the control of the unit sensitivity according to an ambient or control light signal. Thus the control rod 22B provides a light bias which varies the gain of the device within which the signal optical rods 22A operate.

From the foregoing discussion and description, it will be apparent that the present invention has broad application to optical data processing and control.

While there has been herewithin presented what is at present are considered to be the preferred embodiments of the invention, it will be apparent to those of ordinary skill in the art that many modifications and changes may be thereto made without departing from the true spirit and scope of the invention.

It will be considered, therefore, that all those changes and modifications which fall fairly within the scope of the invention shall be considered to be applicable to the invention and subject to its scope.

What is claimed is:

1. A photoelectric device, comprising:

a semiconductive base having a rectifying junction, said base being responsive to electromagnetic energy in the vicinity of said junction;

coupling means including at least one path defining element coupled directly to said base and junction for coupling electromagnetic energy signals from a signal source along and within said element to said base, said path defining element including integral means for shielding said element from extraneous signals; and output means coupled to said base for providing output electrical signals in response to electromagnetic signals from said source.

2. A gating circuit embodying the photoelectric device of claim 1 wherein: a plurality of path defining elements are coupled to said photosensitive base, said base having a predetermined threshold level responsive only to the coincidence of input signals on all elements to provide an output electrical signal.

3. A gating circuit embodying the photoelectric device of claim 1 wherein: a plurality of path defining elements are coupled to said photosensitive base, said base having a predetermined threshold level responsive to the presence of an input light signal in any one of said elements to provide an output electrical signal.

4. An integration circuit embodying the photoelectric device of claim 1 wherein: a plurality of path defining elements are coupled to said base, said base having a predetermined threshold level responsive to the presence of input light signals in a predetermined number and sum of input signals in said elements to provide an electrical output signal.

5. An integration circuit embodying the photoelectric device of claim 1 wherein: a plurality of path defining elements are coupled to said base, said base providing an output signal which varies in direct relation to the number and sum of input signals in said elements.

6. An optical mixing circuit embodying the photoelectric device of claim 1 wherein: a plurality of path defining elements couple a plurality of separable, independent light signals to said photoactive base and said device includes biasing means coupled to said base to produce an output electrical signal representing modulation products of said input light signals.

7. A photoelectric device, comprising:

a semiconductive base having a rectifying junction, said base being responsive to light energy in the vicinity of said junction; housing means enclosing said base;

optical coupling means including at least one integrally shielded optical fiber rod coupled directly to said base and junction for coupling light energy signals from a remote signal source along and within said optical fiber to said base said optical rod protruding through and beyond said housing to said remote signal source; and output means coupled to said base for providing output electrical signals in response to light signals from said device;

8. A photoelectric device, comprising:

a semiconductor device having a circular base forming a PN rectifying junction with an emitter and with an annular collector, and an ohmically joined, conductive electrode extending respectively from said emitter, collector, and base, and with said base being responsive to light energy; housing means enclosing said device;

optical coupling means including at least one integrally shielded optical fiber rod coupled directly to said base within said device for coupling light signals from a remote signal source along and within said optical fiber rod to said base said optical rod protruding through and beyond said housing to said remote signal source; and output means coupled to said semiconductor device for providing output electrical signals in response to light signals from said source.

9. A photoelectric device, comprising:

an NPN semiconductor device having a circular, P-type base forming a rectifying junction with an N-type emitter and with an N-type annular collector, and an ohmically joined conductive electrode extending respectively from said emitter, collector, and base, said base being responsive to light energy; housing means enclosing said device optical coupling means including at least one integrally shielded optical fiber rod coupled to said base within said device for coupling light signals from a remote signal source along and within said optical fiber to said base said optical rod protruding through and beyond said housing to said remote signal source; and output means coupled to said device for providing output electrical signals in response to light signals from said source.

10. A photoelectric device, comprising:

a PNP semiconductor device having a circular, N-type base forming a rectifying junction with a P-type emitter and with a P-type annular collector, and an ohmically joined conductive electrode extending respectively said emitter, collector and base, said base being responsive to light energy; housing means enclosing said device;

optical coupling means including at least one integrally shielded optical fiber rod coupled to said base within said device for coupling light signals from a remote signal source along and within said optical fiber to said base said optical rod protruding through and beyond said housing to said remote signal source; and output means coupled to said device for providing output electrical signals in response to light signals from said source.

11. A photoelectric device, comprising: a semiconductor device having an active base forming a PN rectifying junction with an emitter and having a collector element and an ohmically joined conductive electrode extending respectively from said emitter, collector and base, said base being responsive to light energy; housing means enclosing said device; optical coupling means including at least one integrally shielded optical fiber rod coupled directly to said base within said device for coupling light signals from an isolated signal source along and within said optical fiber to said base, said optical rod coupling to said isolated signal source; and output means coupled to said device for providing output electrical signals in response to light signals from said source.

12. A gating circuit embodying the photoelectric device of claim 11 wherein:

a plurality of optical fiber rods are coupled to said photosensitive base, said base having a predetermined threshold level responsive only to the coincidence of input signals on all rods to provide an output electrical signal.

13. A gating circuit embodying the photoelectric device of claim 11 wherein:

a plurality of optical fiber rods are coupled to said photosensitive base, and junction, said base having a predetermined threshold level responsive to the presence of an input light signal in any one of said rods to provide an output electrical signal in response to the presence of an input light signal in any one of said optical light rods.

14. A photoelectric device, comprising:

a semiconductor device as defined by claim 11 in which one or more of the input optical light rods are used to provide a bias and control light signal in order to permit the activation of the photosensitive base area according to the application of a bias and control light signal within the selected optical light rod.

15. A photoelectric device, comprising:

a semiconductive active base area responsive to electromagnetic energy;

coupling means including at least one path defining element coupled to said base for coupling electromagnetic energy signals from a signal source along and within said element to said base, said path defining element including integral means for shielding said element from extraneous signals; and output means coupled to said base for providing output electrical signals in response to electromagnetic signals from said source.

16. A photoelectric device, comprising:

a semiconductor device having an active base forming a PN rectifying junction with an emitter and having a collector element, and an ohmically joined conductive electrode extending respectively from said emitter, collector and base, said base being responsive to light energy; housing means enclosing said device;

optical coupling means including at least one integrally shielded optical channel coupled to said base within said device for coupling light signals from a remote signal source along and within said optical channel to said base, said optical rod protruding through and beyond said housing to said remote signal source; and output means coupled to said device for providing output electrical signals in response to light signals from said source.

17. A photoelectric device, comprising:

a semiconductor device having a linear base forming a PN rectifying junction with an emitter and with a linear collector, said emitter and collector being linearly disposed along the width of the base and on opposite sides of an etched trough in the base area which provides depth control of the active photosensitive base, and an ohmically joined electrode extending respectively from said emitter, collector and base, said base being responsive to light energy; housing means enclosing said device;

optical coupling means including at least one integrally shielded optical fiber rod coupled to said base within said device for coupling light energy signals from a remote signal source along and within said optical fiber rod to said base, said optical rod protruding through and beyond said housing to said remote signal source; and output means coupled to said device for providing output electrical signals in response to light signals from said source.

18. A photoelectric device, comprising:

a semiconductor device having a linear base forming a PN rectifying junction with an emitter and with a collector, said emitter and collector being linearly disposed along the width of the base, and an ohmically joined electrode extending respectively from said emitter, collector and base, said base being responsive to light energy; housing means enclosing said device;

optical coupling means including at least one integrally shielded optical channel coupled to said base within said device for coupling light energy signals from a remote signal source along and within said optical channel to said base, said optical channel protruding through and beyond said housing to said remote signal source; and output means coupled to said device for providing output electrical signals in response to light signals from said source.

19. A photoelectric device, comprising:

a semiconductor device including a first photoactive base area having a rectifying junction with an emitter and a second photoactive base area ohmically joined with said first base area for controlling the gain of said device in response to bias and control light signals respectively, said base areas being responsive to light energy in the vicinity of said emitted junction;

coupling means including optical fiber rods coupled to said first base, directly, for coupling light energy signals from a signal source along and within said optical light rods to said first base; and output means coupled to said semiconductor device for providing output electrical signals in response to the bias light control and input light signals.

20. A photoelectric device as defined in claim 19 wherein:

the semiconductor device includes means for applying a transverse potential to said second base area to vary the gain of said device in a preferred direction such that said output electrical signal varies in accordance with the position of an input light signal.

References Cited

UNITED STATES PATENTS

| | | | |
|---|---|---|---|
| 2,640,901 | 6/1953 | Kinman | 250—227 X |
| 2,759,124 | 8/1956 | Willis | 250—206 X |
| 2,812,445 | 11/1957 | Anderson | 250—206 X |
| 2,948,815 | 8/1960 | Willems et al. | 250—206 X |
| 3,004,168 | 10/1961 | Emeis | 250—211 |
| 3,114,283 | 12/1963 | Gruner | 250—227 X |
| 3,188,478 | 6/1965 | Binks | 250—227 X |
| 3,205,390 | 9/1965 | Sheldon | 250—227 X |
| 3,213,179 | 10/1965 | Clauson | 250—227 X |

OTHER REFERENCES

Basic Theory and Application of Transistors, Dept. of the Army Technical Manual, TM 11–690, March 1959, pp. 237–239.

RALPH G. NILSON, *Primary Examiner.*

M. A. LEAVITT, *Assistant Examiner.*

U.S. Cl. X.R.

250—227; 350—96; 317—235